(12) United States Patent
Palay et al.

(10) Patent No.: US 9,367,599 B2
(45) Date of Patent: Jun. 14, 2016

(54) SEARCH BASED SPECIFICATION FOR DATA SYNCHRONIZATION

(75) Inventors: Andrew J. Palay, Mountain View, CA (US); Aaron Whyte, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 62 days.

(21) Appl. No.: 12/603,453

(22) Filed: Oct. 21, 2009

(65) Prior Publication Data

US 2010/0121874 A1   May 13, 2010

Related U.S. Application Data

(60) Provisional application No. 61/107,276, filed on Oct. 21, 2008.

(51) Int. Cl.
*G06F 17/30* (2006.01)
(52) U.S. Cl.
CPC ................... *G06F 17/30581* (2013.01)
(58) Field of Classification Search
CPC .............. G06F 3/065; G06F 17/30575; G06F 17/30578; G06F 17/30581; H04L 29/0854
USPC ................... 707/610–639, 758, 769
See application file for complete search history.

(56) References Cited

U.S. PATENT DOCUMENTS

| | | | | |
|---|---|---|---|---|
| 5,551,024 A | * | 8/1996 | Waters | G06F 17/30955 |
| 6,560,655 B1 | * | 5/2003 | Grambihler et al. | 709/248 |
| 7,627,595 B2 | | 12/2009 | Hao et al. | |
| 7,747,566 B2 | * | 6/2010 | Tysowski et al. | 707/610 |
| 7,860,825 B2 | * | 12/2010 | Chatterjee et al. | 707/610 |
| 7,860,827 B1 | * | 12/2010 | Ayyad | 707/610 |
| 7,865,548 B2 | * | 1/2011 | Chen | G06Q 10/107 709/203 |
| 8,023,934 B2 | | 9/2011 | Jeide et al. | |

(Continued)

FOREIGN PATENT DOCUMENTS

| EP | 1014629 A2 | 6/2000 |
|---|---|---|
| JP | 2001-022627 | 1/2001 |

(Continued)

OTHER PUBLICATIONS

Liu et al., "Continual Queries for Internet Scale Event-Driven Information Delivery", 1999, IEEE Transactions on Knowledge and Data Engineering, vol. 11, No. 4, pp. 610-628.*

(Continued)

*Primary Examiner* — James Trujillo
*Assistant Examiner* — Hubert Cheung
(74) *Attorney, Agent, or Firm* — Morgan, Lewis & Bockius LLP

(57) ABSTRACT

Systems and methods for a search based specification for data synchronization are described. In some embodiments, a method to synchronize information of a client device from a server includes, at a client, receiving a communication from a server to synchronize information between the client device and the server, wherein the information is selected from all application data on the server by a search mechanism in accordance with one or more one or more search criteria, and the information is arranged in an order prior to transmission from the server; and performing operations to synchronize application data on the client in accordance with at least portions of the information received from the server. Other embodiments are also described.

18 Claims, 9 Drawing Sheets

---

931 — Receive a communication from a server to synchronize information between the client device and the server, wherein the information is selected from all application data on the server by a search mechanism in accordance with one or more search criteria determined at the client assigned to each data item, wherein the information and is arranged in an order prior to transmission from the server 932 — Perform operations to synchronize application data on the client in accordance with at least portions of the information received from the server

(56) References Cited

U.S. PATENT DOCUMENTS

| | | | |
|---|---|---|---|
| 2001/0039629 | A1 | 11/2001 | Feague |
| 2002/0078075 | A1 | 6/2002 | Colson et al. |
| 2004/0030739 | A1 | 2/2004 | Yousefi'zadeh |
| 2005/0050142 | A1 | 3/2005 | Capone et al. |
| 2005/0147130 | A1* | 7/2005 | Hurwitz et al. ............... 370/503 |
| 2006/0047819 | A1 | 3/2006 | Caddes et al. |
| 2007/0203712 | A1 | 8/2007 | Sunday et al. |
| 2007/0203954 | A1* | 8/2007 | Vargas et al. ................ 707/201 |
| 2007/0255854 | A1* | 11/2007 | Khosravy et al. ............. 709/248 |
| 2007/0276836 | A1 | 11/2007 | Chatterjee et al. |
| 2007/0283049 | A1 | 12/2007 | Rakowski et al. |
| 2008/0104133 | A1* | 5/2008 | Chellappa et al. ............ 707/201 |
| 2008/0124004 | A1* | 5/2008 | Suse ................. G06F 17/30265 382/306 |
| 2008/0140693 | A1 | 6/2008 | Hao et al. |
| 2008/0168526 | A1* | 7/2008 | Robbin et al. ................ 725/139 |
| 2008/0242370 | A1 | 10/2008 | Lando et al. |
| 2008/0307109 | A1 | 12/2008 | Galloway et al. |
| 2009/0177754 | A1* | 7/2009 | Brezina et al. ................ 709/206 |
| 2009/0247134 | A1* | 10/2009 | Jeide ................... H04L 67/2842 455/414.2 |
| 2009/0265203 | A1* | 10/2009 | Marcus .............. G06Q 10/1093 705/7.18 |

FOREIGN PATENT DOCUMENTS

| | | |
|---|---|---|
| JP | 2002-014860 | 1/2002 |
| JP | 2005-242403 | 9/2005 |
| JP | 2007-115247 | 5/2007 |
| WO | WO 2007/100688 | 9/2007 |
| WO | WO 2008/095125 | 8/2008 |

OTHER PUBLICATIONS

International Search Report and Written Opinion for PCT/US2009/061540 dated Jan. 25, 2010.

International Search Report and Written Opinion for Related Application No. PCT/US2009/061530, Date of Mailing Apr. 6, 2010, 14 pages.

Leiba, B., "IMAP4 Implementation Recommendations," IBM T.J. Watson Research Center, dratf-leiba-imap-implement-guide-09.txt, IETF Standard-Working-Draft, Internet Engineering Task Force, IETF, CH, No. 9, May 1, 1999, 1-22 pages.

Managing IMAP, "Anatomy of an IMAP Session," Chapter 3, downloaded on Oct. 3, 2010, 15 pages, http://proquest.safaribooksonline.com.

Melnikov, A., "Synchronization Operations for Disconnected IMAP4 Clients,"draft-melnikov-imap-disc-02.txt, IETF Standard-Working-Draft, Internet Engineering Task Force, IEFT, CH No. 2, Oct. 1, 2002, 1-20 pages.

Google Inc., Communication pursuant to Article 94(3) EPC, EP 09744845.0, Jan. 22, 2014, 6 pgs.

Google Inc., Communication pursuant to Article 94(3) EPC, EP 09744847.6, Oct. 16, 2013, 6 pgs.

Google Inc., Notice of Reasons for Rejection, JP 2011-533306, Jan. 30, 2014, 3 pgs.

Google Inc., Notice of Reasons for Rejection, JP 2011-533308, Jan. 30, 2014, 3 pgs.

Google, Patent Examination Report No. 1, AU 2009308475, Nov. 24, 2014, 4 pgs.

Google, Patent Examination Report No. 1, AU 2009308480, Nov. 27, 2014, 3 pgs.

Google Inc., Notice of Allowance, KR 2011-7011731, Jul. 9, 2015, 1 pg.

Google Inc., Notice to File a Response, KR 2011-7011731, Feb. 27, 2015, 2 pgs.

Google Inc., Notice to File a Response, KR 2011-7011744, Feb. 4, 2015, 5 pgs.

Google Inc., Notice to File a Response, KR 2011-7011744, Jun. 22, 2015, 5 pgs.

Google Inc., Notice of Allowance, KR 2011-7011744, Aug. 24, 2015, 1 pg.

Google Inc., Notice of Acceptance, AU Patent Application 2009308475, Oct. 27, 2015, 2 pgs.

Google Inc., Notice of Acceptance, AU Patent Application 2009308480, Dec. 3, 2015, 2 pgs.

* cited by examiner

SEARCH BASED SPECIFICATION FOR DATA SYNCHRONIZATION

RELATED APPLICATIONS

This application claims priority to U.S. Provisional Patent Application No. 61/107,276, filed Oct. 21, 2008, entitled "A Search Based Specification for Data Synchronization," the content of which is incorporated by reference herein in its entirety.

This application is related to U.S. Provisional Patent Application No. 61/107,312, titled "Always Ready client/Server Data Synchronization" filed on Oct. 21, 2008, which is incorporated by reference in its entirety.

This application is related to U.S. patent application Ser. No. 12/603,447, titled "Always Ready client/Server Data Synchronization" filed on Oct. 21, 2009, which is incorporated by reference in its entirety.

TECHNICAL FIELD

The disclosed embodiments generally related to the field of client—server interaction, in particular, the synchronization of data between a client device and a server.

BACKGROUND

Many software applications (e.g., e-mail) are designed to operate on both a client device and a server system, or on a client device with support from a server system. These applications enable a user to freely create, receive, transmit, and modify data regardless of whether the user is operating on the client device or on the server. Synchronization of data between the client and the server allows consistency to be maintained between the application data residing on the client and the server. Synchronization is important as, for reasons of efficiency, a client device generally operates mainly with locally-stored data. One common implementation is to store a complete set of the data associated with a client-server application on the server and maintain a subset of data relevant to or commonly used by the user on the client device. When synchronizing server data with client device, many methods of synchronization require priming of the complete local cache before allowing the use of the data that have been synchronized. In fact, synchronization is typically an all or none process. If the local cache is not completely primed, none of the data can be used by the client.

The client is generally constraint by memory and thus contains a subset of the application data that resides on the server. Server application data for synchronization with the client should be selected such that information most relevant to the user of the client is synchronized. Many traditional mechanisms of synchronization lack the ability to select and prioritize information that is relevant to the user for synchronization. For example, data in synchronization systems utilizing folders for organizing information data is limited. These data may only be categorized in association with one folder during data synchronization. Furthermore, systems where application data are not categorized into folders make selection of data for synchronization even more difficult. A more flexible system to overcome shortcomings of existing synchronization mechanisms is desirable.

SUMMARY OF EMBODIMENTS

In some embodiments, a method to synchronize information of a client device from a server includes, at a client, receiving a communication from a server to synchronize information between the client device and the server, wherein the information is selected from all application data on the server by a search mechanism in accordance with one or more search criteria, and is arranged in an order prior to transmission from the server; and performing operations to synchronize application data on the client in accordance with at least portions of the information received from the server.

In other embodiments, this method includes information that have instructions for performing at least one of addition, deletion, and modification operation to application data on the client in the order from high priority to low priority as arranged on the server before transmission to the client.

Still in other embodiments, the receiving of this method includes two independent synchronization mechanisms operating concurrently wherein a first synchronization mechanism synchronizes a first portion of the information in order of priority and a second synchronization mechanism synchronizes a second portion of the information in chronological order.

In some embodiments, this method includes simultaneously sending unsynchronized application data changes to the server in a synchronization mechanism independent of one or more synchronization mechanisms responsible for receiving the information from the server.

In other embodiments, this method includes searches conducted by the search mechanism which may be prioritized in order such that the selected information in order to prioritize the information to be transmitted to the client in a particular order.

Some embodiments of this disclosure includes a method for a server to synchronize information with a client including, at a server, determining one or more search criteria to be used for performing searches on application data prior to synchronization; selecting information from all application data on the server in accordance with the one or more search criteria using a search mechanism on the server, transmitting the selected information to the client, and keeping a record of the transmitted information that have been successfully synchronized with the client.

In some embodiments, this server method includes simultaneously receiving unsynchronized application data changes from the client in a synchronization mechanism independent of one or more synchronization mechanism responsible for transmitting the selected information to the client. In other embodiments the unsynchronized application data changes may be synchronized serially relative to the synchronization mechanism responsible for transmitting the selected information to the client.

In other embodiments, the selected information of this server method may comprise both data items and change operations to data on the server, wherein the data are arranged and synchronized with the client from a high to low priority and the change operations are arranged and synchronized in a chronological order from old to new based on when each change operation occurred on the server.

In some embodiments, the transmitting of this server method includes two independent synchronization mechanisms operating concurrently wherein a first synchronization mechanism synchronizes a first portion of the information in order of priority and a second synchronization mechanism synchronizes a second portion of the information in chronological order.

BRIEF DESCRIPTION OF THE DRAWINGS

For a better understand of the nature and embodiments of the invention, reference should be made to the Description of Embodiments below, in conjunction with the following drawings in which like reference numbers refer to corresponding parts throughout the figures.

DESCRIPTION OF EMBODIMENTS

The present invention is directed to a client-server system and corresponding to methods and systems of synchronization of items between a client and a server. The present disclosure describes a searched based specification for data synchronization. This implementation controls synchronization by a list of searches based on search criteria. Search based data synchronization is applicable to synchronization of all types of client-server applications having application data and application data changes that may be independently manipulated on the server and the client.

Figure 1:
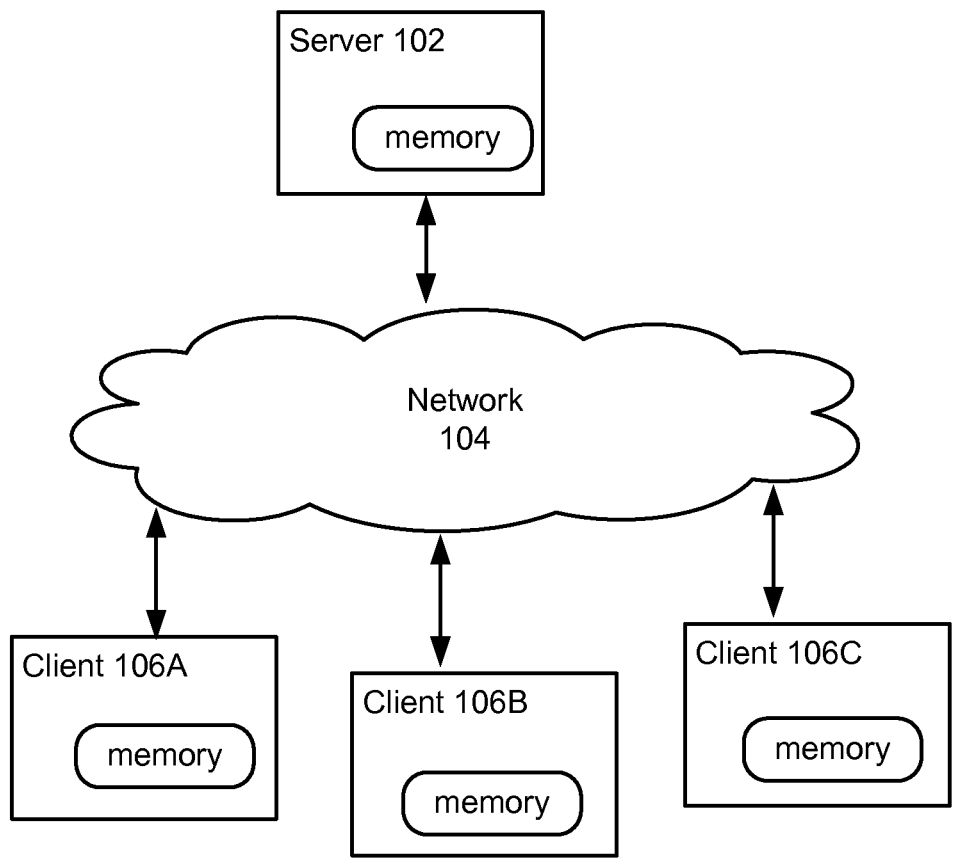
FIG. 1 is a diagram illustrating a client-server based network system in accordance with some embodiments of the present invention.

FIG. 1 schematically illustrates an exemplary client-server based network system. The client-server based network system includes a server 102, a network 104 for communication, and a plurality of client devices 106A-C. It should be understood that a common implementation of this system has at least one server, at least one communication network, and a plurality of client devices. In a different configuration, the system may include a plurality of servers, a plurality of networks and a plurality of client devices.

In some embodiments, the network 104 connecting the server 102 and the clients 106 may be a private or public network and can be wired or wireless to enable communications between the server 104 and the clients 106 such that data exchange is possible. In some embodiments, the network may be the Internet; in others, a communication network may be private or has security to limit access to a group of users. In the latter, the network may be a LAN. Other embodiments of the network 104 may also include a WiFi network and/or a WiMax network. Another embodiment of the network 104 may be a cellular network that enables transmission and reception of data by mobile devices such as cellular telephones and smart phones. Such cellular network may be considered private where only paid subscribers have access thereto.

The client devices 106 may take on various forms. In some embodiments, a client device may be a local computer communicating to a computer server. In other embodiments, a client device may be any one of a personal digital assistant (PDA), a smart phone, or a cellular phone. The client device may operate a software application that can also be operated on a server, or, it may operate an application front end that cooperates with an application back end that operates on the server. The server 102 is capable of performing operations related to the management, data storage requirements, organization and/or execution of an application. For the purpose of this disclosure, both the client 106 and the server 102 include memory in which application data and application data changes to be synchronized can be stored. More detailed descriptions of the server and the client are discussed below in FIGS. 2 and 3 respectively.

Figure 2:
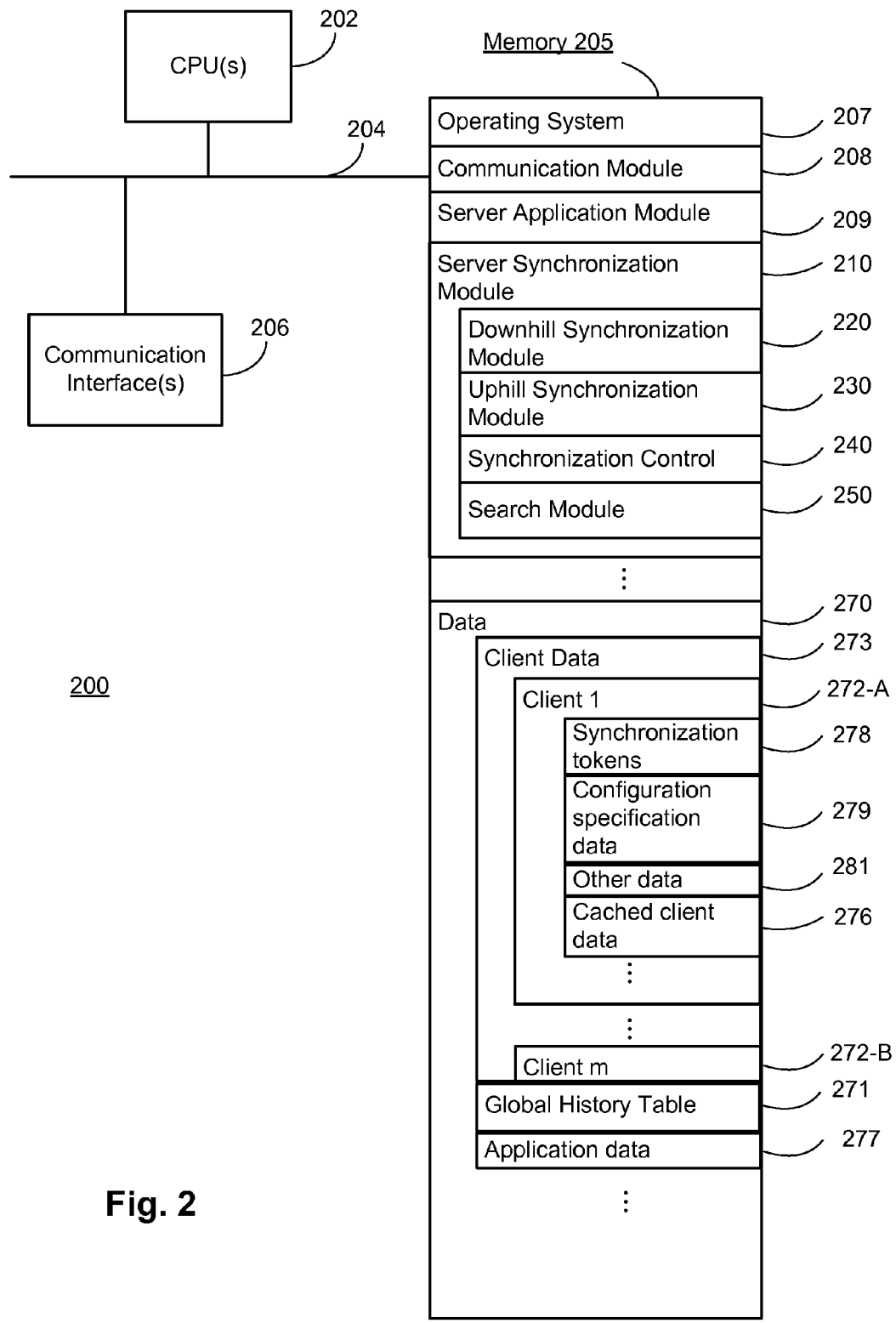
FIG. 2 is a block diagram of an exemplary server in the client-server based network system in accordance with some embodiments of the present invention.

FIG. 2 is a block diagram of an exemplary server in the client-server based network system described with reference to FIG. 1. The server 200 typically includes one or more processing units (CPU's) 202, one or more network or other communication interfaces 206, memory 205, and one or more communication buses 204 for interconnecting these components. Memory 205 includes high-speed random access memory, such as DRAM, SRAM, DDR RAM or other random access solid state memory devices; and non-volatile memory, such as magnetic disk storage devices, optical disk storage devices, flash memory devices, or other non-volatile solid state storage devices. Memory 205 may optionally include one or more storage devices remotely located from the CPU(s) 202.

In some embodiments, memory 205 stores programs, modules and data structures, or a subset thereof that includes: an operating system 207, a communication module 208, server application module 209, server synchronization module 210, and data structures 270. Note that the illustrated organization of these components is exemplary and does not preclude any alternative arrangement or organization of the functionality attributed to the components. Other embodiments may combine the functions attributed to these components in any combination, including a subset or superset of these components. This is true of any and all software components described herein with reference to any server or client device.

The operating system 207 includes procedures for handling various basic system services and for performing hardware dependent tasks.

The communication module 208 is used for interfacing server applications 209 to other server or client devices. Interfacing using the communication module 208 is accomplished via the one or more communication network interfaces 206 (wired or wireless) and one or more communication networks, such as the Internet, other wide area networks, local area networks, metropolitan area networks, and so on.

Application module 209 includes different client driven or server driven applications. If an application is a client driven application, when the application is active on the server, the application itself is driven by commands originating from a corresponding application in the client device. If an application is a server driven application, when the application is active on the server, the application on the server drives a corresponding application on the client device. In some embodiments, applications may be equally driven by the client and the server, configured and adapted for operation in client devices such as a cellular telephone, and may include a server synchronization module 210.

The server synchronization module 210 is used for synchronization of data that may be utilized by one or more applications that operate on a client and a server or that operate cooperatively between a client and server (as is the case for email client and server applications). The synchronization module 210 may include synchronization configurations that are specific to a single application or are generalizable to more than one application. In one embodiment, the synchronization module 210 includes a downhill synchronization module 220, an uphill synchronization module 230, and a synchronization control 240. The functions of these modules correspond to their counterparts on the client, which are described with reference to FIG. 3.

The downhill synchronization module 220 is responsible for synchronizing server application data to the client. Downhill synchronization ensures that application data on the server, and changes to that data, are reflected in the client application data. In one embodiment, downhill synchronization includes forward synchronization and backward synchronizations. In some embodiments, forward synchronization synchronizes operations or changes to data (e.g., adding a star to a message, adding or removing a label from a message, receiving a message, sending a message, updating a contact, etc.) to the client, in chronological order. In other embodiments, backward synchronization synchronizes data from a previous state (e.g., existing messages, contacts, etc.) to the client, in priority order.

The uphill synchronization module 230 is responsible for synchronizing client data changes to the server (e.g., composed a message, deleted a message, added or removed a label, changing information about an appointment etc.) In other words, uphill synchronization ensures that application data changes on the client are reflected in the server application data.

The synchronization control 240 controls the operations of data synchronization in accordance with connectivity to a communications network, detection of unsynchronized data, or other conditions present when data synchronization takes place. In one embodiment, the server is configured to initiate synchronization by responding to a synchronization request from the client, although the reverse may also be possible.

The search module 250 is used by the server to select and sort data and data changes on the server that meet predefined criteria prior to downhill synchronization with the client. The search module 250 allows server data that are most relevant to the user to be selected, prioritized and synchronized with the client according to the specified criteria, so the most relevant information is expedited to the client before the less relevant. Using these identified criteria, the search module may conduct searches in various configurations to achieve a desired effect. For example, searches may be conducted using one criterion at one time where a series of criteria are used. In other embodiments, a single search may be conducted using a combination of criteria. The results of different configurations of searches vary. In one embodiment, different configurations of searches may be performed to reach a particular desired ordering of data for each data synchronization. In other embodiments, the objective may be to separate data or data changes into different groups for synchronization at different times.

The data module 270 includes application data 277 used by the applications in application module 209, a global history table 271, and client data 273. Client data 273 includes information for each individual client 272 A, B. Information for each individual client includes synchronization tokens 278, client configuration data 279, cached client data 276 and other data for the client 281.

The global history table 271 contains information about data operations performed on server data and is used for forward synchronization in one embodiment of synchronization mechanism. Each global history table contains a plurality of server history operation identifications (SHO ID) and each SHO ID represents an individual operation performed on one of the server data. In some embodiments, the information in the global history table is stored chronologically.

The synchronization tokens 278 represent data maintained by the server concerning what the server knows about the client state. In some embodiments, these synchronization tokens include the highest CHO ID from the client that the server has processed in uphill synchronization. In other embodiments, the synchronization tokens represent ranges of data that the client has acknowledged to have handled in backward synchronization. As explained in the related application cited above, these tokens are used to identify and prioritize server data during backward synchronization. Unique identification ensures that the correct data is synchronized.

Configuration specification data 279 are configuration information used by the server to perform synchronization with the client. Configuration information may include, but is not limited to, search criteria (e.g., fields of data, content of data, labels associated with data etc.), number of items to be synchronized, priority order of data to be synchronized etc.

Cache client data 276 includes all other data on the server that belongs to the particular client and may include, but is not limited to, other client-application data. Other client specific data 281 may include, but is not limited to, other synchronization specific information for other applications.

Figure 3:
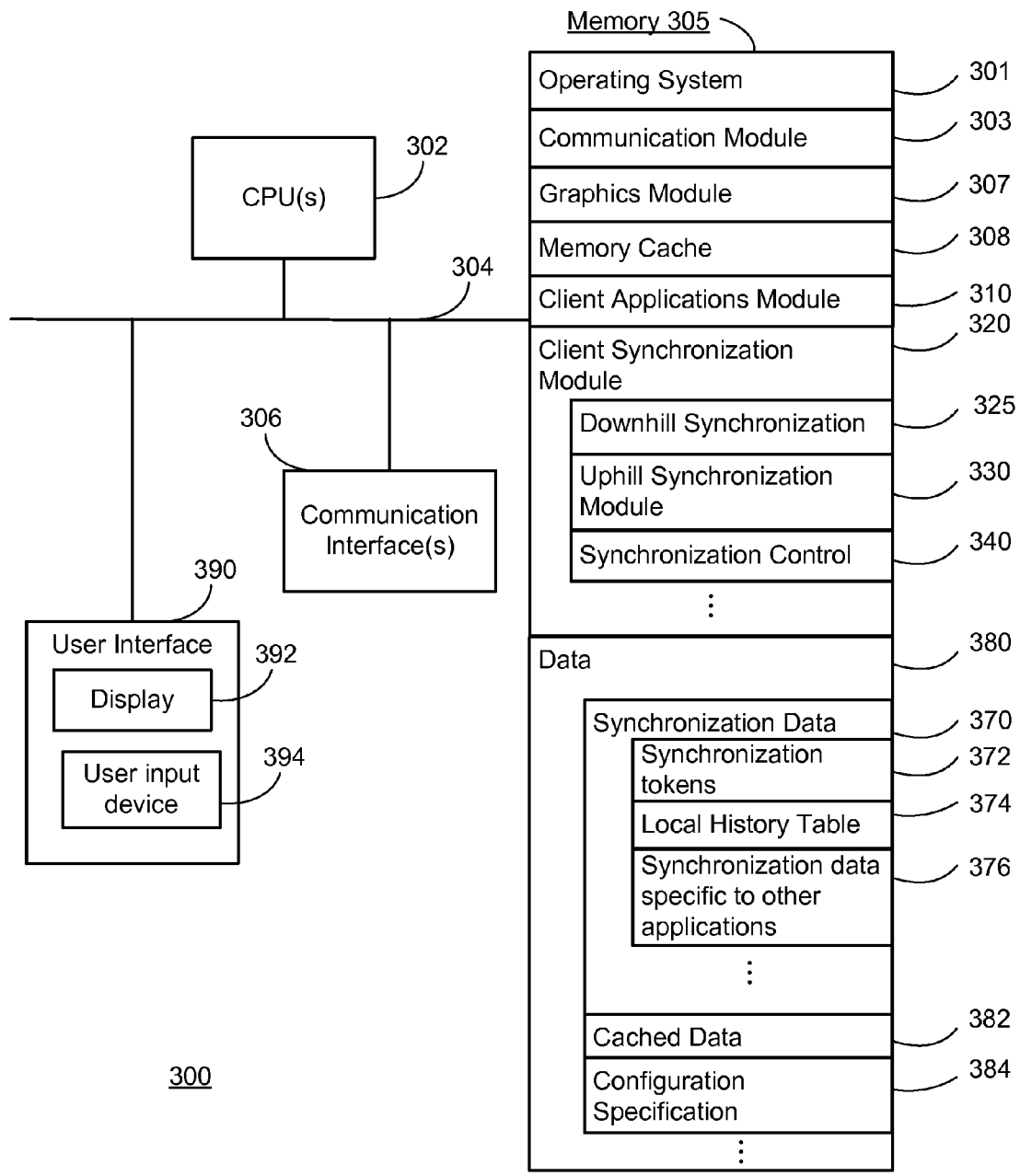
FIG. 3 is a block diagram of an exemplary client that interacts with the server in accordance with some embodiments of the present invention.

FIG. 3 is a block diagram of an exemplary client 300 that interacts with a server. The client 300 generally includes one or more processing units (CPU's) 302, one or more network or other communications interfaces 306, memory 305, and one or more communication buses 304 for interconnecting these components. The communication buses 304 may include circuitry (sometimes called a chipset) that interconnects and controls communications between system components.

The client device 300 may include a user interface 390 having an output device such as a display 392 or audio output such as a speaker (not shown) and a user input device 394. The display 392 may be an active matrix display or a touch screen display, etc., and the user input device 394 may include any combination of, for example, a numeric entry key pad, soft keys, touch pad, alphanumeric entry key pad or a touch screen etc. The Memory 305 may include high speed random access memory and may also include non-volatile memory, such as one or more magnetic disk storage devices, and portable storage devices such as flash memory that can be remotely located from the central processing unit(s) 302. In some embodiments, the memory 305 may store programs, modules and data structures, or a subset thereof that include an operating system 301, a communication module 303, a graphics module 307, a memory cache 308, a client applications module 310, a client synchronization module 320 and data 380.

The operating system 301 includes procedures for handling various basic system services and for performing hardware dependent tasks.

The communication module 303 connects the client applications 310 to servers via the one or more communication network interfaces 306 (wired or wireless) and one or more communication networks, such as the Internet, other wide area networks, local area networks, metropolitan area networks, cellular networks and so on.

The memory cache 308 temporarily stores information for quick access by an active application. Examples of information stored may include metadata and other information specific to an application. Generally, when the application becomes inactive, the information is erased.

The client application modules 310 include one or more applications that can be executed on the client device 300. Some of these applications 310 are configured to interact with the server 200 to perform tasks related to communications, user interface management, application customization, and management of specific client applications including email, calendar, text messaging, media players or document editing or viewing software, etc. A client application is driven by the client device when in operation.

The client synchronization module 320 is used for synchronization of data for applications that can operate independently on the client device or the server. The client synchronization module 320 may include synchronization schemes specific to a single application or generic to multiple applications. In one embodiment, the client synchronization module 320 includes a downhill synchronization module 325, an uphill synchronization module 330, a synchronization control 340, and a label search module. The functions of these modules correspond to their counterparts on the server.

The downhill synchronization module 325 is responsible for the client to receive data changes from the server. Similar to the server counterpart, the downhill synchronization, in one embodiment, includes forward synchronization and backward synchronization which are described above and in more details in the related application cited above.

The uphill synchronization module 330, as described above in the server counterpart, is responsible for synchronizing client data changes to the server. One should appreciate that other synchronization schemes for synchronization data changes between the server and the client are possible.

The synchronization control 340 controls the operations of data synchronization in accordance with connectivity to a communications network, detection of unsynchronized data, or other conditions present when data synchronization takes place. In one embodiment, the client is configured to initiate a synchronization request to the server, although the reverse may be possible.

The data module 380 may include data files used by the applications in application module 310 and data used for synchronization with the server. In some embodiments the data module 380 may include at least one of synchronization data 370 for purposes of data synchronization with the server, cached data 382, and configuration specification 384.

The synchronization data 370 may include specific data such as synchronization tokens 372, local/client history table 374, and synchronization data 376 which may be specific to some applications. These data are used specifically for synchronization of the client device with the server.

Synchronization tokens 372 represent data maintained by the client concerning what the client knows about the server state. In some embodiments, these tokens include the highest SHO ID from the server that the client has processed in past forward synchronizations. In other embodiments, the synchronization tokens represent ranges of data that the client has handled during backward synchronization, as determined by the last received acknowledgement from the server.

The local/client history table 374 contains information about data changes on the client. Each entry in this table has a CHO ID and represents a specific data operation. Specifically, information in the local/client history table may be used for uphill synchronization of the data with the client. Synchronization data specific to other applications 376 are different application data specific to different applications.

The cached data 382 represents other data that is stored on the client. This may include data used for various other applications and data to be synchronized with the server.

The configuration specification 384 includes specific configuration information about the client device. This information may be used to identify the client to the server or to other devices for purposes of synchronization, interactions, and in activation and operation of applications. For instance, information contained in the configuration specification may include, but are not limited to, client identification, device specification of the client, identification of application in which data is to be synchronized, and criteria for synchronization etc.

The search based specification described in this disclosure applies to all forms of data synchronization between a server and the client. The search aims to select a subset of data from a larger data set and thus is often applied on the server where the data set is complete. The search produces a focus data set which can be prioritized in accordance with relevance of the data to a user of a client device. This search method complements the synchronization method described in the related application cited above. One of the benefits is to allow user to have control over the selection and prioritization of data changes on the server for synchronization. Search based data synchronization may also be applied to client data, but considering the lesser amount of data on the client, this search method is generally not implemented on the client.

Figure 4:
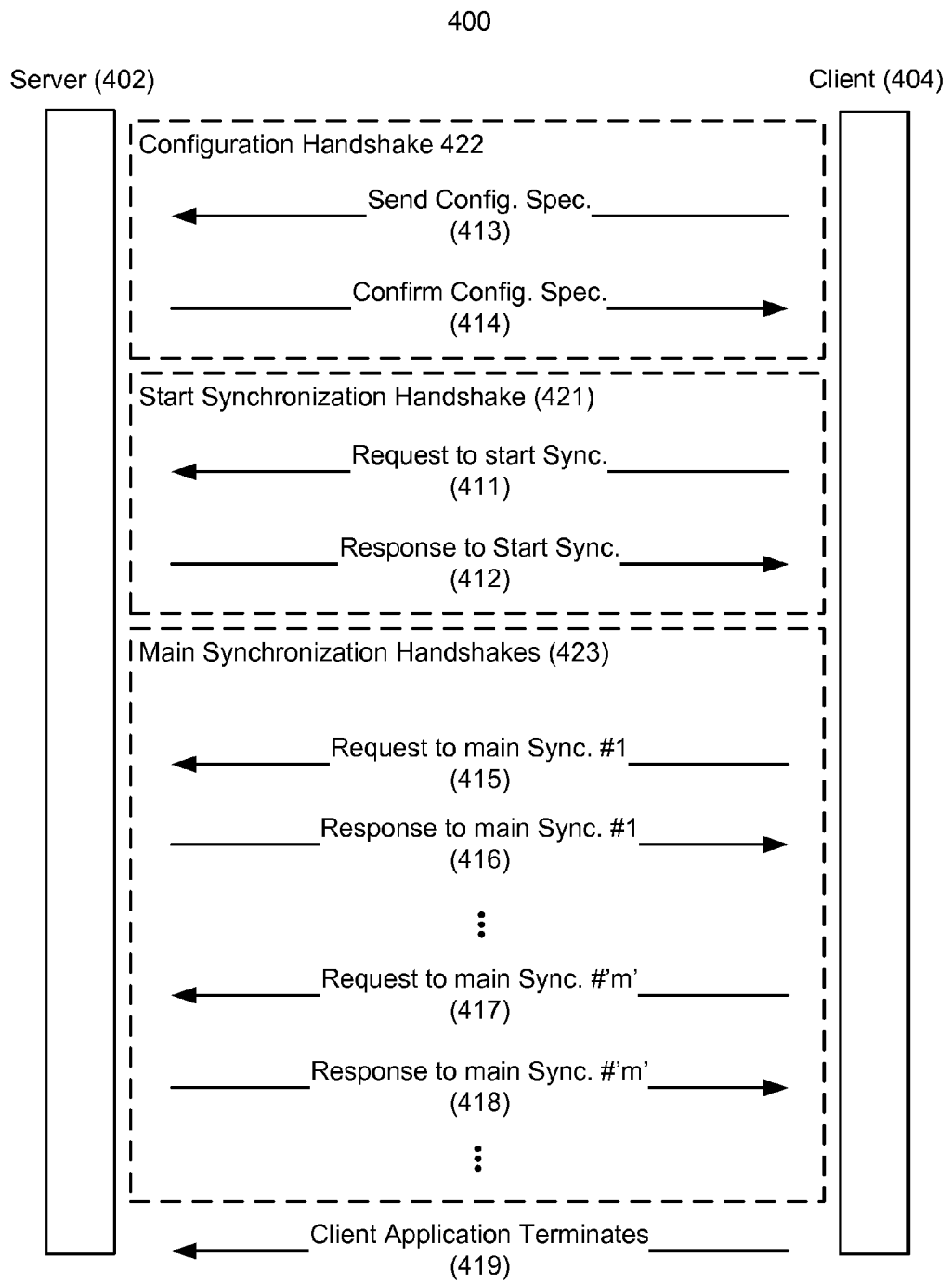
FIG. 4 is a diagram illustrating an exemplary synchronization interaction scheme between the server and the client in accordance with some embodiments of the present invention.

FIG. 4 illustrates an exemplary synchronization interaction scheme 400 between the server 402 and the client 404. In some embodiments, configuration synchronization occurs before the first start synchronization and the main synchronization. Any previous step may be revisited and clients can be reconfigured at will. Start synchronization happens again whenever the client requests it. In some embodiments, start synchronization re-prioritizes backward synchronization. For example, in an email context, backward synchronization may load conversations starting with the most recent ones and ending with the oldest ones. Thus in this case, start synchronization resets the meaning of "most recent" to mean "now". In some embodiments, a start synchronization handshake 421 takes place between the server 402 and the client 404 to initialize the actual data synchronization process which is represented by main synchronization handshake 423. Generally, before a start synchronization handshake 421, a configuration handshake 422 may occur to confirm the synchronization configuration specific to the client. Some embodiments of the start synchronization handshake 421 and the main synchronization handshake 423 are described in greater details in related application as cited above. For example, in some embodiments, the start synchronization handshake is initiated either after an extended period when the client 404 does not communicate with the server 402 (e.g., out of range of communication network, client device powered down, application on client is terminated, or when the device or server is disconnected from a communication network), and prior to the first data synchronization between the client and the server.

The start synchronization handshake 421 identifies the client to the server and establishes a starting point for data synchronization. Each start synchronization handshake has a request 411 and a response 412. In some embodiments, the request 411 originates from the client, and after acknowledging the request, the server sends a response 412. It should be appreciated that start synchronization may be incorporated as part of main synchronization as presented in this disclosure, or eliminated entirely. Furthermore, request may originate from the server instead of the client.

Configuration handshake 422 acts to determine and confirm the parameters for data synchronization between the server and the client. Configuration parameters may be specified or modified by a user using the client to control the search mechanism on the server for selecting and sorting server data for synchronization. In an exemplary handshake, the client sends a configuration specification request 413 to the server and receives a configuration specification response 414 from the server to confirm the configuration specification before the main synchronization. In other embodiments, the configuration handshake 422 may be a part of the start synchronization handshake 421 or a part of the main synchronization handshake 423. Furthermore, the request may originate from the server to the client to confirm the configuration specification.

Main synchronization handshakes 423 occur after server data ranges for synchronization are established. Each main synchronization handshake has a request 415, 417 and a response 416, 418. In the exemplary illustration, the requests 415, 417 are sent from the client, and the responses 416, 418 are sent by the server. In some embodiments, the main synchronization request 415, 417 includes client data changes in uphill synchronization with the server and the main synchronization response 416, 418 includes server data and server change operations associated with forward and backward synchronizations in downhill synchronization with the client. In some embodiments, main synchronization repeats immediately as long as there is remaining unsynchronized data on either the server or the client. Furthermore, main synchronization repeats itself in accordance with a predefined condition such as a fixed interval or whenever there are new data or data operations on either the server or the client, as long as there is an active connection between the server and the client. In some embodiments, start synchronization does not recur unless there is a long disconnect, predefined as certain time duration such as an hour, or when the application terminates and restarts 419.

Figure 5:
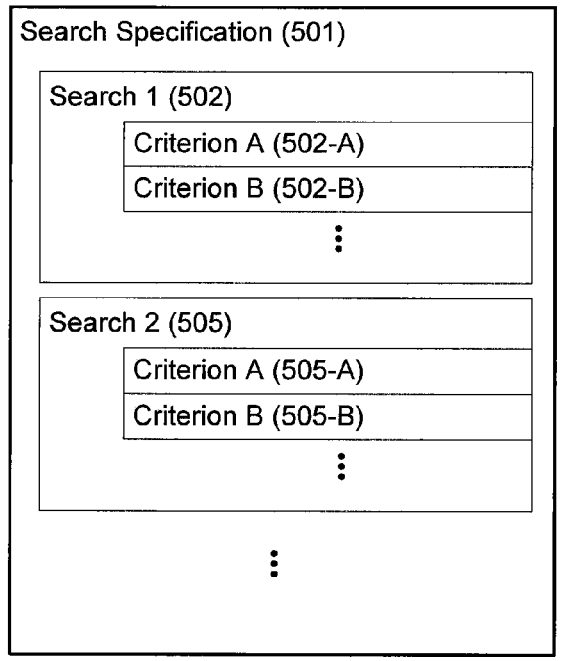
FIG. 5 is a diagram illustrating an exemplary search specification for performing searches for data synchronization in accordance with some embodiments of the present invention.

FIG. 5 illustrates an exemplary search specification for performing searches for data synchronization. In some embodiments the searches are performed on the server prior to data synchronization. In other embodiments, the searches may be performed simultaneously as data is being synchronized. In some embodiments a search specification 501 may include multiple searches. Each of the searches 502, 505 may contain one or more search criteria. In some embodiments, these searches may be conducted in parallel or in series. Searches may also be specific to data type or a time period. In some embodiments search criteria 502-A,B and 505-A,B in each search may represent different aspects of the data. For instance, criteria may include, but are not limited to data creation date, data modification date, labels associated with a data, fields of entry present in data. Some specific examples may include, but not limited to, labels associated with an email message, labels associated with an email conversation, sender, subject fields in an email message or conversation, the address, phone number and email fields of a contact, the subject, date and time of a calendar entry etc.

Figure 6:
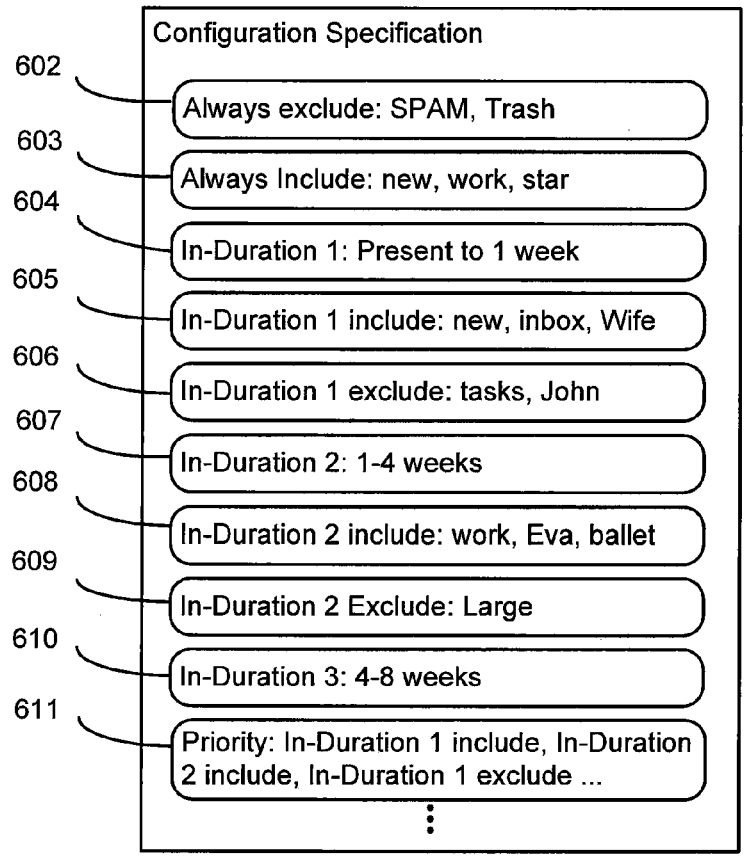
FIG. 6 is a diagram illustrating an exemplary configuration specification in accordance with some embodiments of the present invention

FIG. 6 illustrates an exemplary request for configuration specification in the configuration handshake. The configuration specification describes the parameters used by the search mechanism for configuring the search to select and sort data on the server prior to synchronization. In some embodiments, the configuration specification includes how the search criteria are defined. For instance, the search criteria may include various labels specified by the user via the client for performing the searches in a particular order. In other words, the labels may be ordered such that the results of the searches conform to the order in which the criteria are arranged. In other embodiments, the criteria may be arbitrarily ordered but there may be a specific entry that informs the search mechanism of a specific order for conducting the searches. In some embodiments, the search criteria may come from the client, in other embodiments, the search criteria may be determined by the server.

FIG. 6 also illustrates multiple categories of criteria that may be used by the search mechanism for selecting and prioritizing server data for synchronization. Different categories of criteria may be used for searching. In some embodiments, search criteria may include but are not limited to different types of labels. Some exemplary label categories include, but are not limited to, always exclude 602, always include 603, in-duration 604, 607, 610 in-duration-include 605, 608, in-duration-exclude 606, 609, and priority 611. In some embodiments, an "Always include" list includes labels to be always included in the data synchronization; an "Always exclude" list includes labels to be always excluded from the data synchronization. For exemplary purposes, the "Always include" list may include all messages/conversations/contacts/calendar/tasks labeled with "new", "work", or "star". The "Always exclude" list may contain messages/conversations/contacts/calendar/task entries labeled as "trash" or SPAM. In-Duration is a category specifying a duration from which data is searched.

For exemplary purposes, three In-Durations are illustrated. They include durations from Present to 1 week prior to the present date, from 1 week prior to 4 weeks prior, and from 4 weeks prior to 8 weeks prior. These in-duration labels may be applied by the system to search for application data within a specified time-frame. Furthermore, in-duration-include and in-duration-exclude categories may each specify attribute and non-attribute labels contained within these time frames for inclusion or exclusion in each search. By combining a few simple search rules and the use of labels, an unlimited number of ways may be used to select and order application data so that the most relevant data to a user may be selected and sent to the client in an order of priority. Order of application data synchronized with the client may be important as data synchronization may sometimes be cut short for any reason, therefore, it is preferred that relevant data of high priority be synchronized and sent to the client before data of lower priority.

Figure 7:
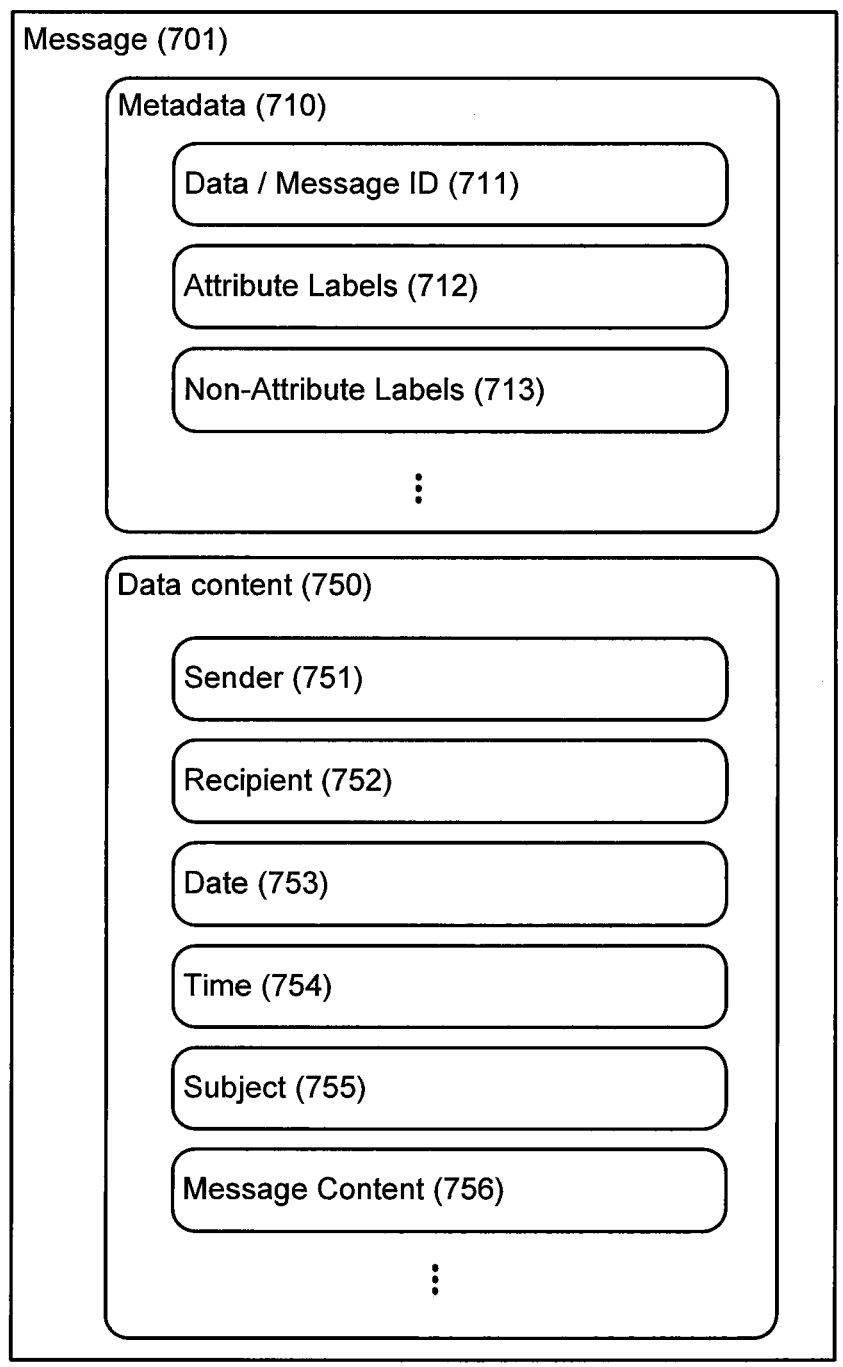
FIG. 7 is a diagram illustrating information contained in exemplary data, such as messages, in accordance with some embodiments of the present invention.

FIG. 7 illustrates an exemplary item of data in form of an email message that may be used by the search mechanism described in this disclosure. Message 701 includes at least two categories of information, metadata 710 and data content 750. In one embodiment, metadata 710 contains information that may be used by the synchronization and search mechanisms for identifying, selecting, and sorting the message. Some examples of different fields of metadata include the data/message ID 711, attribute labels 712, and non-attribute labels 713. Other metadata not shown but may include and are not limited to popularity ratings and other secondary information extrinsic to the application data such as associated languages, associated locale, features identifying whether the application data specifically meets personal preferences of a user of the client device (e.g., personal taste).

The metadata 710 in each data item may or may not be visible to a user, but it may be edited by the system and/or the user as status or content for the data is changed. In some embodiments, data/message ID 711 may be same as a synchronization token used by backward synchronization. In one embodiment, this data/message ID 711 is unique for each message (or item in the application data) and cannot be changed. This data/message ID 711 is generally important for identification of the data item during the process of synchronization.

Attribute labels 712 are labels concerning information that cannot be change by the user. This includes information that may inherently be a part of the data. For example, an email message will always remain an email message, and will not be labeled as a contact entry.

Non-attribute labels 713 include information about the item of data that can be changed by the user. For example, a message initially classified by the system as SPAM has a SPAM label, and unless the user marks the message as non-SPAM, the label will not change. Similarly, after a user reads a new message, the message is no longer unread, and the system automatically removes the unread label associated with the new message, unless the user deliberately marks the message unread. Similarly, non-attribute labels 713 may include labels that are designed by the user for sorting application data and are untouched by the system. The system is not concerned with these user devised labels. However, the system may apply labels to data in response to certain user or system operations including, but not limited to, deletion and SPAM classification etc.

In some embodiments, attachments to messages (not shown) may have a separate label assigned by the system (e.g., attribute labels). In some embodiments, the label may simply indicate an attachment as such, or in more sophisticated implementation, the attachment may further be labeled by data type to which the attachment corresponds.

Similarly, the data content 750 of the data item (e.g., message 701) may also contain information that may be used by the synchronization and search mechanisms for identifying, selecting, and sorting the message. For example, data content 750 may further contain different fields of information. In this example of an email message, the data content may include fields such as sender 751, recipient 752, date 753, time 754, subject 755, and message content 756. Each of these fields may serve as a search criterion and specific entry in each of these fields may be a search target for the search mechanism. In the synchronization process, changes made to any of these fields may be viewed as a data change and thus causing the data change or the entire item to be forward synchronized or uphill synchronized depending on whether the data change is performed on the server or the client respectively.

Figure 8:
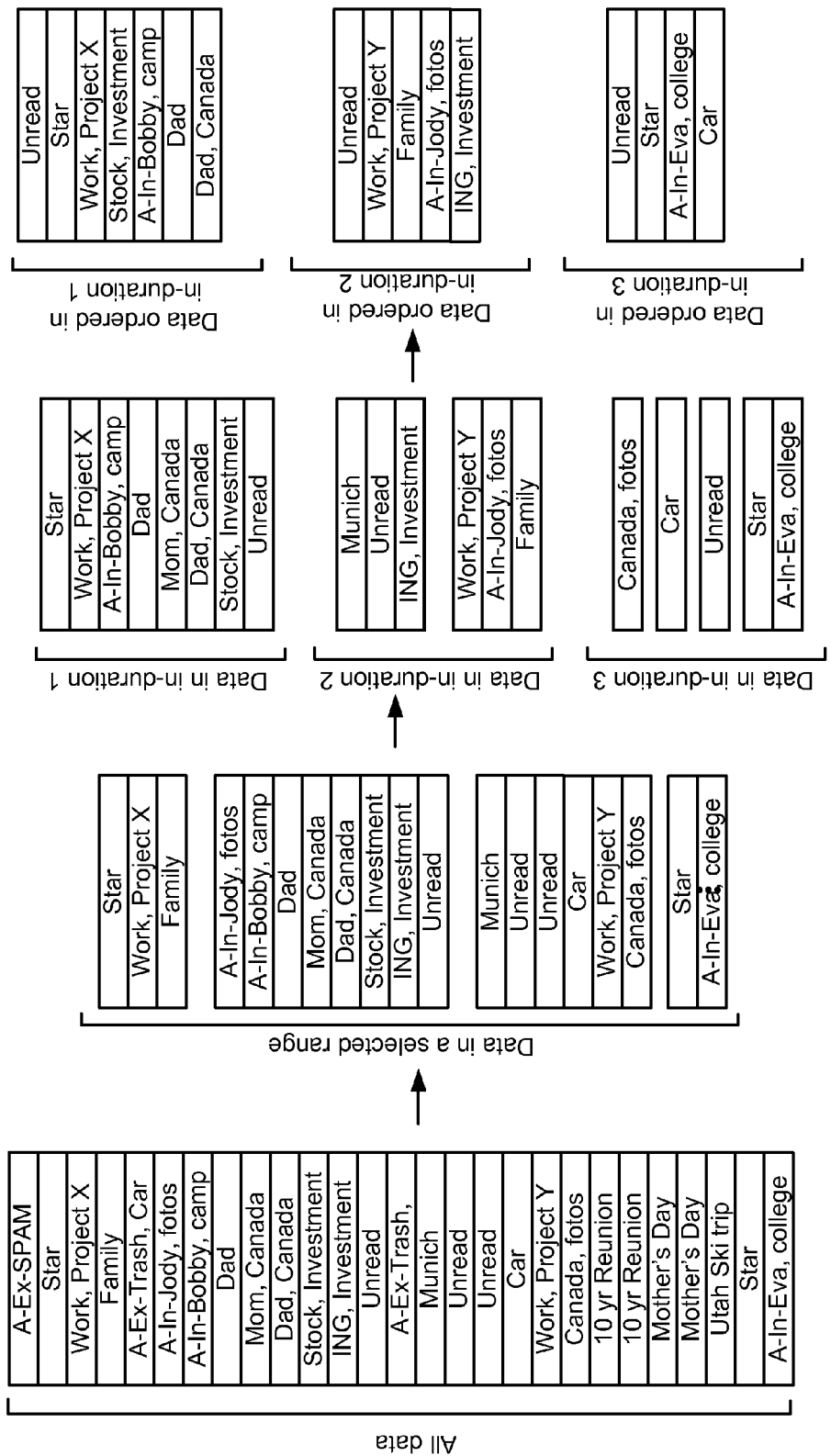
FIG. 8A to 8D are diagrams illustrating an exemplary search based mechanism selecting information from a set of application data in accordance with some embodiments of the present invention.

FIGS. 8A to 8D illustrate an exemplary process of the search mechanism selecting and sorting data. These figures demonstrate the selection and sorting process for data on the server, although the process may equally apply on a client or elsewhere for selecting or sorting of data. Also, FIG. 8A illustrates a list of messages as exemplary application data on a server, however, it should be appreciated that other types of application data may include, but not limited to, documents, spreadsheets, charts, graphs, photos, RSS feed items, data in Instant Messaging (IM), data in short message service (SMS), contact groups, or any other data type. Also for exemplary purposes, data items are used for illustration, however, one should appreciate that the same principles may be applied to history operations on the server and the client for the purposes of pruning and organizing the data changes. Furthermore, the data changes represented by the history operations in forward or uphill synchronizations may be searched according to search criteria specified in the configuration specification.

In some embodiments, the list of application data in FIG. 8A corresponds to a list of email messages on a server for an email application. In some embodiments, the list of email messages corresponds to a list of data each having a unique identification represented by a backward synchronization token (e.g., BST) for the purpose of backward synchronization. It should be appreciated that the list of data may be in a form of contact information, calendar entry or other data used by a client-server application. Furthermore, it should be appreciated that even though one type of data is listed, multiple types of data may be listed and co-mingled together.

Each message in FIG. 8A is associated with a number of data attributes (e.g., message content, sender field, date field, time field, subject field, labels etc.) that may serve as search criteria. In the current example, different types of labels are used as the main search criteria and each message is associated with at least one label. As described before, labels may be categorized into at least two groups: attribute labels and non-attribute labels. Messages are inherently associated with an attribute label (not shown) of "email message". Labels shown in the messages in FIG. 8A are generally non-attribute labels. For purposes of exemplary illustration, non-attribute labels include, but are not limited to "star", "Work", "Project X", "SPAM", "Trash", "Car", "Jody", "Fotos", "Camp", "Mom", "Dad", "Canada", "Stocks", "Investment", "ING", "Project Y", "10 yr Reunion", "Mother's Day", "Utah Ski trip", "Eva", "College", and "unread".

Attribute and non-attribute labels may further be categorized for purposes of searches. For example, in some embodiments, categories as illustrated, may include but are not limited to, "Always Include" (A-In-), "Always Exclude" (A-Ex-), and "in-duration". Some non-attribute labels classified as "Always Include" include Jody and Bobby, and some non-attribute labels classified as "Always Exclude" include SPAM and Trash. "In-duration" labels generally define a time duration and may be specified by a user. For instance, "In-duration 1" may refer to a time frame from present to 1 week prior; "In-duration 2" may refer to a time frame from 1 week prior to 4 weeks prior; "In-duration 3" may refer to a time frame from 4 weeks prior to 8 weeks prior, etc. Furthermore, "include" and "exclude" sub-categories may be added into these "In-duration" categories so that labels may be included in these durations (e.g., "In-Duration 1-include") or excluded in these durations (e.g., "In-Duration 2-exclude") for conducting a more detailed level of search. In some embodiments, during implementation of the search mechanism, searches are conducted to select or narrow the data. Selected data may be ordered by narrowing searches after a broader range of data has been identified, or data may be ordered in accordance with sequential application of searches so that search results are arranged in order of the sequential searches.

In the example illustrated, FIG. 8B results from application of the search mechanism by selecting all messages having the labels "Always Include", and messages that fall within "In-durations 1, 2, 3". As shown, messages associated with the labels "A-Ex" (e.g., Always exclude, such as Trash and SPAM), and certain older messages that are outside of the "In-durations 1, 2, 3" range (e.g., labels of "10 yr Reunion", "Mother's Day", and "Utah Ski Trip") are excluded.

FIG. 8C illustrates the selected messages sorted in accordance with in-durations by the search mechanism. For purposes of exemplary illustration, user of the client device may prefer to receive the most recent messages first. Therefore, messages within the last week (e.g., present to 1 week prior) will be placed before messages within the last month (e.g., 1 week prior to 4 weeks prior), which are placed before messages within the last 2 months (e.g., 4 weeks prior to 8 weeks prior) for purposes of data synchronization.

FIG. 8D illustrates the final ordering of messages in each in-duration as arranged by the search mechanism according to priorities of the labels specified by a user prior to data synchronization. For purposes of exemplary illustration, a user may specify that for all ranges of data, messages should be prioritized according to labels, in order, "unread", "star", and "work". Therefore, for messages in all separate "in-durations" categories, "unread" messages are placed before messages with "star" label, which are placed before messages with "work" label. In other embodiments, the priority of labels may be specified individually for each "in-duration". Rest of the messages may be arranged arbitrarily or they may be arranged by order of how searches are performed.

For instance, in "in-duration-1", labels "Investment" and "Dad" are classified under "in-duration 1-include" and label "Canada" is classified under "in-duration 1-exclude". In some embodiments, whenever there is a conflict between any "include" category and "exclude" category, the "include" category prevail and overrides the "exclude" classification. In this example, a message having labels "Dad, Canada" has conflicting instructions from the searches to both be included and excluded, therefore, this message is included. However, when the search is silent (e.g., "mom"), the message classified as "mom, Canada" will be excluded as the rule for excluding messages with the label "Canada" is in effect. This message with labels "mom, Canada" was originally included in in-duration 1 because of the date associated with message that satisfies the "In-Duration-1" classification, but not because of the "mom" label. The message with labels "A-In-Bobby, Camp" is included because it is a message that falls within in-duration 1 and it is to be always included, but not because of the label "camp".

For messages in "in-duration 2", messages are arranged following the order of "unread", "star", and "work". For purposes of exemplary illustration, the label "Munich" is included in the "in-duration 2-exclude" category, so the message labeled "Munich" is excluded from the final list. Similarly, the messages labeled "A-In-Jody, fotos" and "ING, Investment" are included because these labels are classified under "in-duration 2-include" category.

For messages in "in-duration 3", messages are similarly arranged in order of the prioritized labels "unread", "star", "work" as in-durations 1 and 2. Similarly, the label "Canada" is classified under "in-duration 3-exclude" and therefore, the message labeled "Canada, fotos" is excluded. In a different embodiment, a user may specify that for in-duration 3, the labels associated with "excluded" may prevail over labels associated with "included", so even if label "fotos" is classified as "in-duration 3-included", the message labeled with "Canada, fotos" may still be excluded.

In some embodiments, the search based mechanism may be applied before and after operations are performed on the application to determine an action for the operation. For example, if a user added a label to a message and the label is to exclude the message from being synchronized, the original message which has a copy residing on the client device, will be removed from the client device after the label is added to the corresponding application data on the server. Similarly, adding a label to a message may cause that message to be synchronized on to the client even though the original message was not on the client.

In summary, the search mechanism may cause different effects for data on the server. First, if the corresponding application data is not on the client, an operation may result in the search mechanism adding or synchronizing the application data onto the client. Second, if the corresponding application data is on the client, an operation may result in the search mechanism not performing any action to the corresponding data on the client. Third, if the corresponding application data is on the client, an operation may result in the search mechanism removing the corresponding client. Fourth, if the corresponding application data is on the client, an operation may result in the search mechanism revising or making a change to the corresponding data same as the operation performed to the application data on the server.

Figure 9:
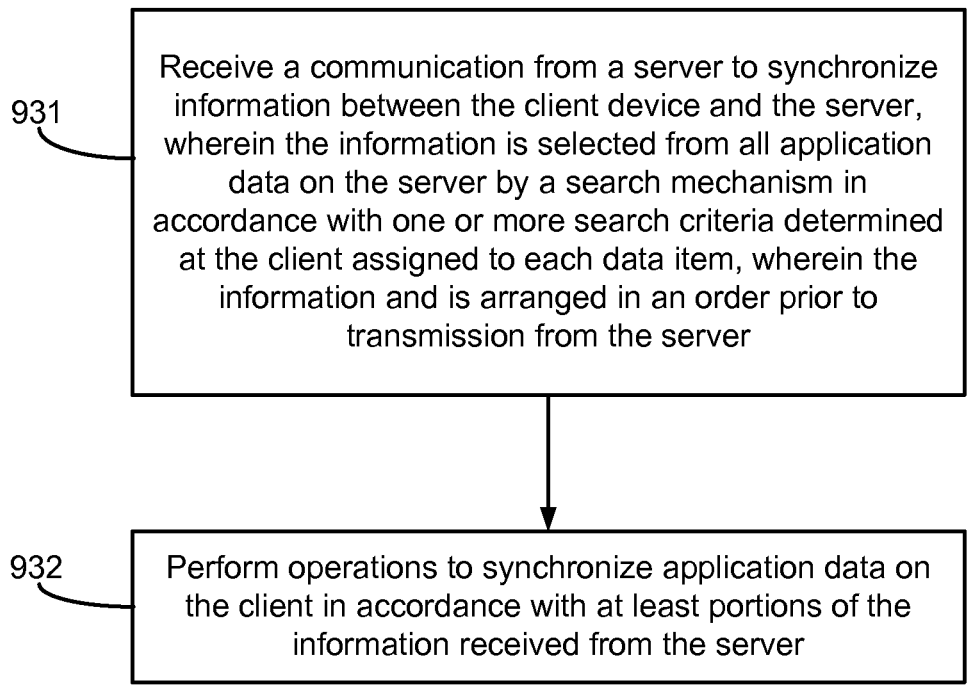
FIG. 9 is a flow diagram illustrating an exemplary method of a client receiving server data selected by a search mechanism in accordance with some embodiments of the present invention.

FIG. 9 is a flow diagram illustrating an exemplary method of a client receiving server data selected by a search mechanism. In some embodiments, as illustrated in block 931, the client receives a communication from a server to synchronize information between the client device and the server. The information is selected from all server application data by a search mechanism in accordance with one or more search criteria and is arranged in an order prior to transmission from the server. In some embodiments the search criteria may be determined at the client. In block 932, the client performs operations to synchronize application data on the client in accordance with at least portions of the information received from the server.

Figure 10:
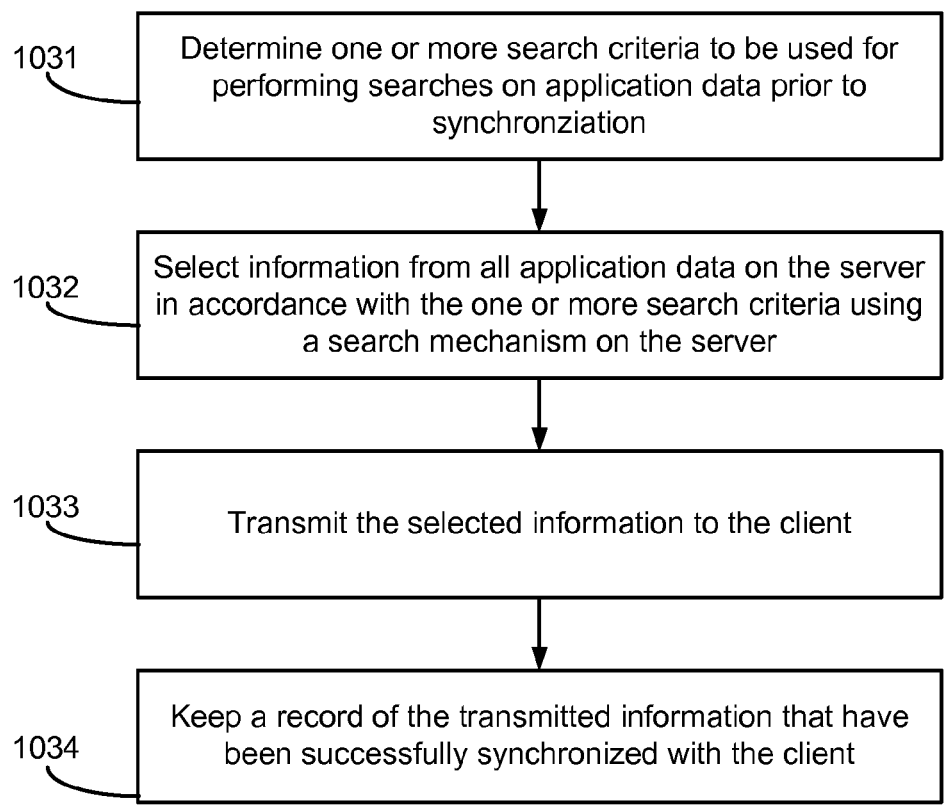
FIG. 10 is a flow diagram illustrating an exemplary method of a server sending server application data selected by a search mechanism in accordance with some embodiments of the present invention.

FIG. 10 is a flow diagram illustrating an exemplary method of a server sending server application data selected by a search mechanism. In block 1031, the server determines one or more search criteria to be used for performing searches on the server application data prior to synchronization. In block 1032, the server selects information from all server application data in accordance with the one or more search criteria using a search mechanism on the server. In block 1033, the server transmits the selected information to the client. In block 1034, the server keeps a record of the transmitted information that has been successfully synchronized with the client.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method to synchronize information between a first computing device and a second computing device, comprising:
   at the first computing device having one or more processors and memory storing programs for execution by the one or more processors:
   obtaining search criteria for synchronizing electronic messages between the first computing device and the second computing device, wherein:
   the search criteria relate to labels associated with the electronic messages, wherein the labels are distinct from contents of the electronic messages;
   the search criteria include:
   a first set of search criteria, the first set of search criteria including a criterion specifying that the first set of electronic messages include electronic messages associated with labels in a first set of one or more labels, wherein within the first set of search criteria the labels in the first set of one or more labels are ordered in a first order, and
   a second set of search criteria different from the first set of search criteria, the second set of search criteria including a criterion specifying that the second set of electronic messages include electronic messages associated with labels in a second set of one or more labels, wherein within the second set of search criteria the labels in the second set of one or more labels are ordered in a second order;

the first set of search criteria is associated with a first time-frame; and the second set of search criteria is associated with a second time-frame that does not overlap the first time-frame;

initiating a concurrent search of (i) a first set of matching electronic messages from the first time-frame in accordance with the first set of search criteria, wherein the first set of matching electronic messages are ordered in accordance with the first order of the first set of one or more labels, and (ii) a second set of matching electronic messages from the second time-frame in accordance with the second set of search criteria, wherein the second set of matching electronic messages are ordered in accordance with the second order of the second set of one or more labels; and concurrent with the search of the first set of matching electronic messages:

synchronizing the first set of matching electronic messages between the first computing device and the second computing device in accordance with the ordering of the first set of matching electronic messages.

2. The method of claim 1, wherein
the first set of electronic messages and the second set of electronic messages are synchronized concurrently; and
the first set of electronic messages is synchronized in order of priority; and
the first set of electronic messages is synchronized in chronological order.

3. The method of claim 1, wherein the first matching electronic message is synchronized while the search of the first set of matching electronic messages is still ongoing.

4. The method of claim 1, wherein the labels further include attribute labels, which are not changeable by a user, and non-attribute labels, which are changeable by the user.

5. The method of claim 1, wherein:
the first set of one or more labels includes at least a respective label that is not included in the second set of one or more labels.

6. The method of claim 1, wherein the first set of electronic messages is synchronized between the first computing device and the second computing device before the second set of electronic messages is synchronized between the first computing device and the second computing device.

7. A first computing device for communicating with a second computing device, comprising:
one or more processors;
a memory coupled to the one or more processors; and
one or more programs, stored in the memory, configured for execution by the one or more processors, the one or more programs comprising instructions to:
obtain search criteria for synchronizing electronic messages between the first computing device and the second computing device, wherein:
the search criteria relate to labels associated with the electronic messages, wherein the labels are distinct from contents of the electronic messages;
the search criteria include:
a first set of search criteria, the first set of search criteria including a criterion specifying that the first set of electronic messages include electronic messages associated with labels in a first set of one or more labels, wherein within the first set of search criteria the labels in the first set of one or more labels are ordered in a first order, and a second set of search criteria different from the first set of search criteria, the second set of search criteria including a criterion specifying that the second set of electronic messages include electronic messages associated with labels in a second set of one or more labels, wherein within the second set of search criteria the labels in the second set of one or more labels are ordered in a second order;

the first set of search criteria is associated with a first time-frame; and the second set of search criteria is associated with a second time-frame that does not overlap the first time-frame;

initiate a concurrent search of (i) a first set of matching electronic messages from the first time-frame in accordance with the first set of search criteria, wherein the first set of matching electronic messages are ordered in accordance with the first order of the first set of one or more labels, and (ii) a second set of matching electronic messages from the second time-frame in accordance with the second set of search criteria, wherein the second set of matching electronic messages are ordered in accordance with the second order of the second set of one or more labels; and concurrent with the search of the first set of matching electronic messages:

synchronize the first set of matching electronic messages between the first computing device and the second computing device in accordance with the ordering of the first set of matching electronic messages.

8. The first computing device of claim 7, wherein the first set of electronic messages and the second set of electronic messages are synchronized concurrently, and
the first set of electronic messages is synchronized in order of priority; and
the first set of electronic messages is synchronized in chronological order.

9. The first computing device of claim 7, wherein:
the first matching electronic message is synchronized while the search of the first set of matching electronic messages is still ongoing.

10. The first computing device of claim 7, wherein the labels further include attribute labels, which are not changeable by the user, and non-attribute labels, which are changeable by the user.

11. The first computing device of claim 7, wherein:
the first set of one or more labels includes at least a respective label that is not included in the second set of one or more labels.

12. The first computing device of claim 7, wherein the first set of electronic messages is synchronized between the first computing device and the second computing device before the second set of electronic messages is synchronized between the first computing device and the second computing device.

13. A non-transitory computer readable storage medium storing one or more programs, the one or more programs comprising instructions, which when executed by a first computing device with one or more processors, cause the first computing device to:

obtain search criteria for synchronizing electronic messages between the first computing device and a second computing device, wherein:
the search criteria relate to labels associated with the electronic messages, wherein the labels are distinct from contents of the electronic messages;
the search criteria include:
a first set of search criteria, the first set of search criteria including a criterion specifying that the first set of electronic messages include electronic messages associated with labels in a first set of one or more labels, wherein within the first set of search criteria the labels in the first set of one or more labels are ordered in a first order, and
a second set of search criteria different from the first set of search criteria, the second set of search criteria including a criterion specifying that the second set of electronic messages include electronic messages associated with labels in a second set of one or more labels, wherein within the second set of search criteria the labels in the second set of one or more labels are ordered in a second order;
the first set of search criteria is associated with a first time-frame; and
the second set of search criteria is associated with a second time-frame that does not overlap the first time-frame;
initiate a concurrent search of (i) a first set of matching electronic messages from the first time-frame in accordance with the first set of search criteria, wherein the first set of matching electronic messages are ordered in accordance with the first order of the first set of one or more labels, and (ii) a second set of matching electronic messages from the second time-frame in accordance with the second set of search criteria, wherein the second set of matching electronic messages are ordered in accordance with the second order of the second set of one or more labels; and
concurrent with the search of the first set of matching electronic messages:
synchronize the first set of matching electronic messages between the first computing device and the second computing device in accordance with the ordering of the first set of matching electronic messages.

14. The non-transitory computer readable storage medium of claim 13, wherein the first set of electronic messages and the second set of electronic messages are synchronized concurrently, and
the first set of electronic messages is synchronized in order of priority; and
the first set of electronic messages is synchronized in chronological order.

15. The non-transitory computer readable storage medium of claim 13, wherein:
the first matching electronic message is synchronized while the search of the first set of matching electronic messages is still ongoing.

16. The non-transitory computer readable storage medium of claim 13, wherein the labels further include attribute labels, which are not changeable by the user, and non-attribute labels, which are changeable by the user.

17. The non-transitory computer readable storage medium of claim 13, wherein:
the first set of one or more labels includes at least a respective label that is not included in the second set of one or more labels.

18. The non-transitory computer readable storage medium of claim 13, wherein the first set of electronic messages is synchronized between the first computing device and the second computing device before the second set of electronic messages is synchronized between the first computing device and the second computing device.

* * * * *